United States Patent

Dehari

[11] Patent Number: 5,207,141
[45] Date of Patent: May 4, 1993

[54] TURNTABLE POSITIONING DEVICE OF DESK TYPE CUTTING MACHINE

[75] Inventor: Tomoshige Dehari, Hiroshima, Japan

[73] Assignee: Ryobi Limited, Tokyo, Japan

[21] Appl. No.: 826,863

[22] Filed: Jan. 28, 1992

[30] Foreign Application Priority Data

Jan. 30, 1991 [JP] Japan .................. 3-2605[U]

[51] Int. Cl.$^5$ .................. B23D 45/04; B27B 5/20
[52] U.S. Cl. .................. 83/471.3; 83/486.1; 83/490
[58] Field of Search .................. 83/471.3, 490, 468.3, 83/581, 473, 486.1

[56] References Cited

U.S. PATENT DOCUMENTS

| | | | |
|---|---|---|---|
| 3,821,918 | 7/1974 | Niehaus et al. | 83/471.3 |
| 4,011,782 | 3/1977 | Clark et al. | 83/471.3 |
| 4,245,533 | 1/1981 | Batson | 83/471.3 |
| 4,559,857 | 12/1985 | Grossmann et al. | 83/471.3 |
| 4,869,142 | 9/1989 | Sato et al. | 83/467.1 |
| 4,934,233 | 6/1990 | Brundage et al. | 83/397 |
| 5,063,805 | 11/1991 | Brundage | 83/468.3 |

FOREIGN PATENT DOCUMENTS

63-169214 4/1988 Japan .

Primary Examiner—Eugenia Jones
Attorney, Agent, or Firm—Brooks & Kushman

[57] ABSTRACT

A desk-top cutting machine generally comprises a base, a turntable mounted on a base to be rotatable, a work support fence mounted to the turntable for guiding a workpiece to be cut, a cutter disposed swingably with respect to the workpiece put on the turntable, and a turntable positioning device for positioning the turntable to a predetermined position for a workpiece cutting operation. The turntable positioning device comprises a lock mechanism secured to a side end of the turntable and adapted to be engageable with the base, a positioning engaging assembly disposed on one of the turntable and the base, and an engaging receive member formed on the other of the turntable and the base to be engageable with the positioning engaging assembly. The positioning engaging assembly comprises an engaging base member secured to one of the turntable and the base to be detachable and adjustable in position, a spring member disposed in association with the engaging base member, and engaging member engaged with the engaging receive member by an urging force of the elastic member.

5 Claims, 5 Drawing Sheets

TURNTABLE POSITIONING DEVICE OF DESK TYPE CUTTING MACHINE

BACKGROUND OF THE INVENTION

This invention relates to a device for positioning a turntable of a desk-top cutting machine, and more particularly, to the positioning device of the cutting machine having a cutter mounted rotatably on to a base through a work support fence to be vertically swingable towards a workpiece to be cut disposed on the turntable.

One typical example of a desk-top cutting machine having a turntable positioning device of prior art is disclosed, for example, in Japanese Utility Model Laid-open (KOKAI) Publication No. 63-16921 (16921/1988) as briefly shown in FIGS. 8 and 9.

Referring to FIG. 8, a turntable positioning device of the prior art has a structure such that a steel ball 103 as an engaging member is inserted into a recessed portion 101 formed in a lower surface of a turntable 100 through a spring 102 also accommodated in the recessed portion 101. The steel ball 103 is urged against an upper surface of a base 104 by the urging force of the spring 102 and is engaged with a recessed portion 105 formed on an upper surface of the base 104. Otherwise, as shown in FIG. 9, the spring 102 and the steel ball 103 are accommodated in the recessed portion 101 formed in the base 104 and the steel ball 103 is also engaged with the recessed portion 105 formed on the lower surface of the turntable 100.

In the cases shown in FIGS. 8 and 9, when a workpiece mounted on the turntable 100 through a work support fence 106 is cut with a certain cutting angle, the turntable 100 is rotated. In a case where the work support fence 106 and a circular saw, not shown, are positioned with a suitable angle, the steel ball 103 comes into engagement with the recessed portion 105 formed on the base 104, thus angularly positioning the turntable of the cutting machine.

In such a state, when it is required to cut the workpiece with a certain angle, it is necessary to finely adjust the rotating position of the turntable 100. Namely, it is necessary to adjust either the work support fence 106 or the turntable positioning device.

However, in the prior art structure, the turntable positioning device is constructed as an integral structure with the turntable or base, so that it is difficult or impossible to adjust the positioning device itself. Accordingly, it is necessary to adjust the turntable positioning device by disposing or forming the work support fence independently of the turntable.

The independent formation of the turntable and the work support fence makes complicated the structure of the attaching portions thereof as well as the working thereof. Furthermore, there involves a problem of accidentally moving the work support fence during an actual working resulting in the degradation of a working performance.

SUMMARY OF THE INVENTION

An object of this invention is to substantially eliminate defects or drawbacks encountered in the prior art described above and to provide a turntable positioning device of a desk-top cutting machine capable of accurately positioning the turntable with a simple structure.

This and other objects can be achieved according to this invention by providing a turntable positioning device of a desk-top cutting machine which comprises a base, a turntable mounted on to a base to be rotatable, a work support fence mounted to the turntable for guiding a workpiece to be cut, a cutter means disposed swingably with respect to the workpiece put on the turntable, and a turntable positioning device for positioning the turntable to a predetermined position for a workpiece cutting operation, the turntable positioning device comprising:

a lock mechanism secured to a side end of the turntable and adapted to be engageable with the base;

a positioning engaging means disposed to one of the turntable and the base; and an engaging receive means formed at the other of the turntable and the base to be engageable with the positioning engaging means, wherein the positioning engaging means comprises an engaging base member secured to one of the turntable and the base to be detachable and adjustable in position, an elastic member disposed in association with the engaging base member, and an engaging member engaged with the engaging receive member by an urging force of the elastic member.

In preferred embodiments, the lock mechanism comprises a bearing means disposed to a lower surface of the turntable, a shaft member penetrating and engaged with the bearing means and a handle member secured to one end of the shaft member. The engaging base member comprises a substantially rectangular plate-like member connected to the bearing means and having corner portions at which elongated holes are formed, respectively, and a central recessed portion. The elastic member is a spring accommodated in the central recessed portion and the engaging member is a steel ball having a spherical outer configuration and disposed in the central recessed portion. The steel ball may be substituted with a projection member having a semi-spherical outer configuration and disposed in the central recessed portion. The engaging receive means is formed on the turntable and composed of a plurality of recesses formed in a peripheral surface of the turntable concentric with a rotation center thereof with equal spaces with each other.

According to the turntable positioning device of the structures described above, the positioning engaging means comprises an engaging base member secured to one of the turntable and the base to be detachable and adjustable in position, an elastic member disposed in association with the engaging base member, and an engaging member engaged with the engaging receive member by an urging force of the elastic member. Accordingly, the angular adjustment of the turntable can be done by the position adjustment carried out by this positioning engaging means with a high accuracy.

DESCRIPTION OF THE PREFERRED EMBODIMENTS

One preferred embodiment will be first described hereunder with reference to FIGS. 1 to 6.

Figure 1:
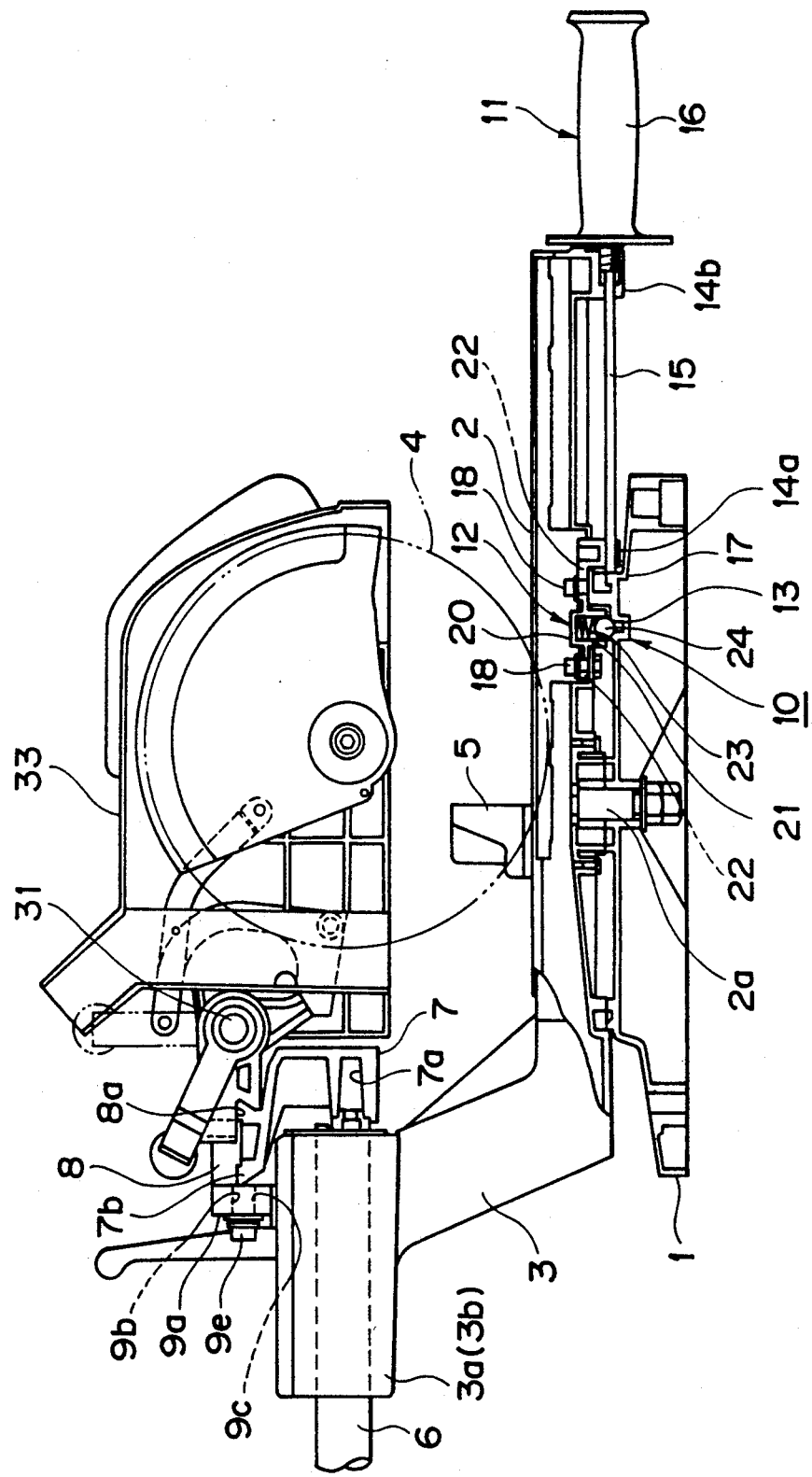
FIG. 1 is a side view, partially in section of a desk-top cutting machine provided with a turntable positioning device according to this invention.
Figure 2:
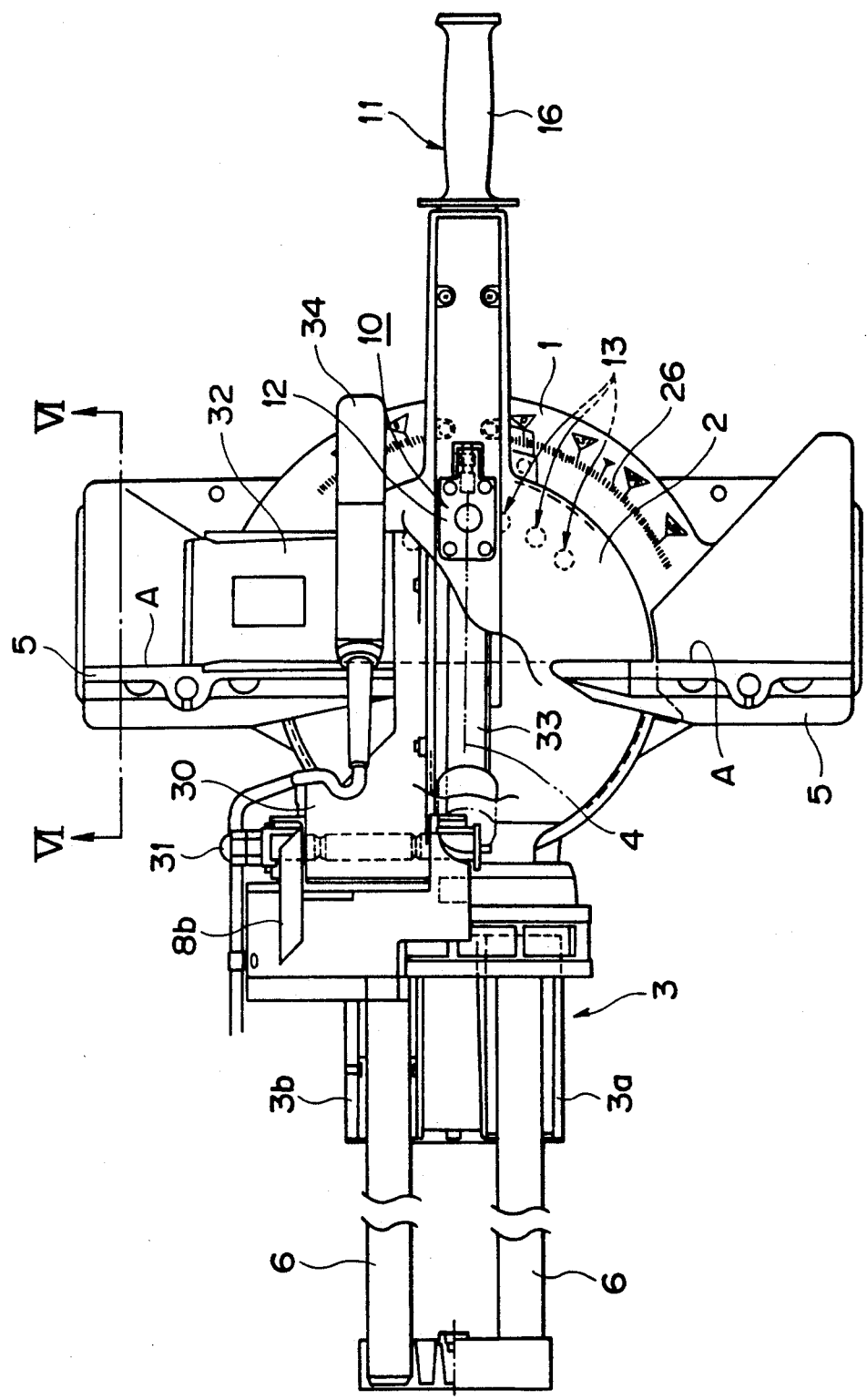
FIG. 2 is a plan view of the desk-top cutting machine of FIG. 1.

Referring to FIGS. 1 and 2, a desk-top cutting machine, in a usable attitude, has its main structure comprising a base 1, a turntable 2 mounted on the upper portion of the base 1 to be rotatable through a rotation shaft 2a, an arm member 3 secured to one end portion of the turntable 2 so as to extend vertically upward and a circular saw blade 4 as a cutter secured to the upper portion of the arm 3 to be swingable and adjustable in a cutting angle.

Figure 6:
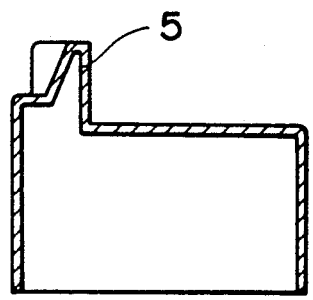
FIG. 6 is a sectional view taken along the line VI—VI of FIG. 2.

A circular saw assembly includes the blade 4, a safety cover 33 for the saw blade 4 and other associated members. The desk-top cutting machine further comprises a turntable positioning device 10 according to this invention, which is disposed between the base 1 and the turntable 2. On the upper surface of the turntable 2 is disposed a work support fence 5 which is integrally formed on the base 1 as shown in FIG. 6.

The turntable positioning device 10 is secured to a side end portion of the turntable 2 and comprises a lock means 11 detachably engaged with the base 1 and a positioning means 12 disposed at a portion of the turntable 2 facing the base 1 to be engageable with an engaging recess means including a plurality of recesses 13 formed in the base 1.

The lock means 11 comprises a shaft 15 penetrating and being screwed with two bearings 14a and 14b disposed in lower surface of the turntable 2 at portions opposite to the location of the arm 3. The shaft 15 extends in the radial direction of the turntable 2. A handle member 16 is secured to an outer end of the shaft 15. When the handle member 16 is operated, the shaft 15 is rotated and moves linearly in screw engagement with the bearings 14a and 14b, and the front, i.e. inner, end of the shaft 15 then abuts against a lock receiving member 17 to thereby lock the turntable 2 on the base 1.

Figure 3:
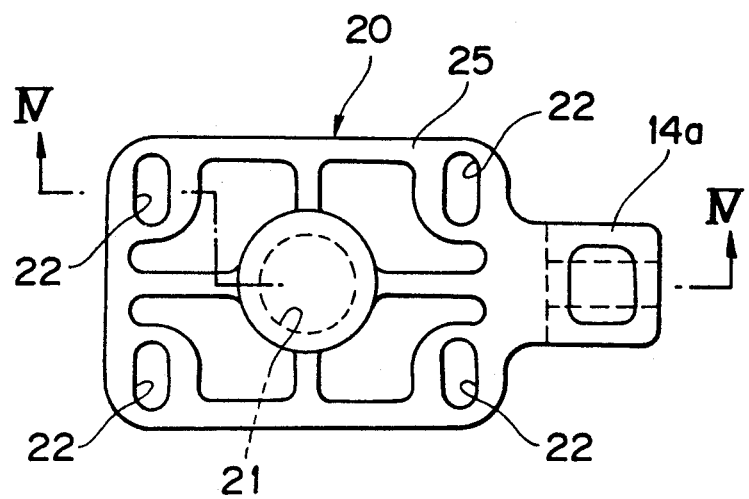
FIG. 3 is a plan view showing one example of an engaging member in association with the cutting machine of FIG. 1.
Figure 4:
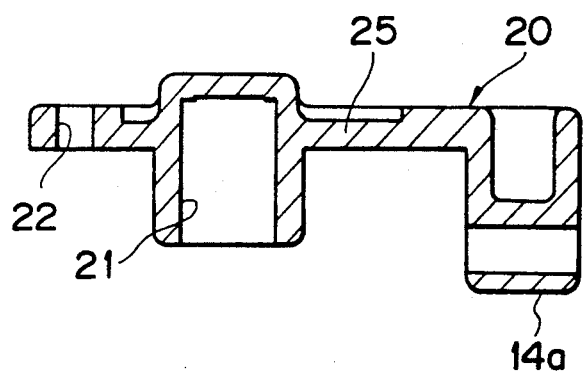
FIG. 4 is a sectional view taken along the line IV—IV of FIG. 3.
Figure 5:
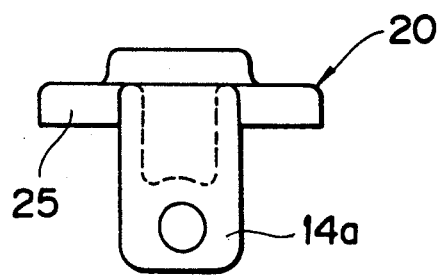
FIG. 5 is a side view of FIG. 3.

The positioning means 12 comprises an engaging base member 20 to be attached to the turntable 2 by means of adjusting bolt 18 to be detachably and adjustably in its position and an engaging member such as a steel ball 24 which is engaged with the engaging recess means 13 by an urging force of an elastic means such as a spring 23 accommodated in a recess 21 formed in a lower surface of the engaging base member 20. The engaging base member 20 is composed of, as shown in FIG. 3 or 5, a substantially rectangular plate-like member 25 connected to one, 14a for example, of the bearings 14a and 14b of the lock means 11 and provided with four corner portions at which a plurality of elongated through holes 22, 22 . . . are formed and a central portion 21 recessed downwardly.

The engaging recesses 13 forming the engaging recess means are provided on the turntable 2 at portions apart with equal spaces with each other on a circle concentric with the center of the rotation of the turntable 2, and a scale 26 for indicating the rotation angle of the circular saw blade 4 and the work support fence 5 is marked at the periphery of the base 1, where is located outward in the radial direction of the engaging recesses 13, as shown in FIG. 2. The scale 26 shows an angle between the work support fence 5 and the circular saw blade 4.

When the angle between them is 90°, the scale 26 shows a reference point (0°). Referring to FIG. 2, the arm member 3 vertically stands from the upper surface of the turntable 2 has an upper portion to which two bearing portions 3a and 3b are provided in parallel to each other so as to extend horizontally in an installed state of the machine. Thrust shafts 6 and 6 are fitted into the bearing portions 3a and 3b, respectively, to be slidable in their axial directions. The thrust shafts 6 and 6 have end portions on the side of the base 1 to which fitting portions 7a and 7a of a first holder 7 are fitted, respectively. A protruded portion 7b having a dove tail shape in section is formed in the upper portion of the holder 7, and the protruded portion 7b has an arcuate shape extending in the front and back surface of the paper in FIG. 1. A second holder 8 is further located to be swingable along the arcuate surface of the protruded portion 7b with respect to the first holder 7, and the second holder 8 has a recessed portion 8a engageable with the upper surface of the protruded portion 7b.

On the side surface of the protruded portion 7b of the first holder 7 is disposed a stopper block 9a which is provided with a hole 9b through which a shaft 9c of a lever 9e for fastening and loosening the two holders 7 and 8 penetrates. The lever shaft 9c has a front end, a lefthand end a viewed in FIG. 2, having a threaded portion, which is screw engaged with a screw-hole, not shown, of the second holder 8. The lever 9e is secured to a rear end, also as viewed, of the lever shaft 9c.

Two brackets 8b and 8b are provided separately from each other at the second holder 8. An end portion of a gear case 30 is fitted between the two brackets so as to be pivotally supported by a support shaft 31. The gear case 30 is operatively coupled to the circular saw blade 4 through a motor housing 32, to which a safety cover 33 covering the circular saw blade 4 is mounted. On the support shaft 31 is mounted a coil spring, not shown, which urges the gear case 30 and, hence, the circular saw blade 4 to their upper limit positions. A reference numeral 34 in FIG. 2 denotes a handle for operating the circular saw assembly including the saw blade 4 and the safety cover 33.

The turntable positioning device will operates in the following manner.

When it is required to determine a rotation angle of the turntable 2, the adjusting bolts 18 are first inserted into the elongated holes 22 formed at corner portions of the plate-like portion 25 of the engaging base member 20 and the bolts 18 are loosely fastened as temporary fastening to the turntable 2. Namely, with reference to FIG. 2, the circular saw blade 4 is positioned so as to have a right angle with respect to the surface A of the work support fence 5. This right angled position is measured by a usual right angled ruler, for example, and when the circular saw blade 4 is in measurement in position of the right angle, the position of the right angle, the positioning means 12 is completely fastened to the turntable 2 by means of the adjusting bolts 18. Under this state, the circular saw blade 4 and the surface A of the work support fence 5 constitutes the right angle (90°), and the turntable 2 and the circular saw blade 4 are together rotated by the operation of the handle 16.

In the next step, an indication member, not shown, attached to the turntable 2 by means of a vis, for example, is adjusted so that the scale 26 indicates the "0"-angle position. At this time, the circular saw blade 4 has the right angle with respect to the surface A of the work support fence 5 and the indication member indicates the "0"-angle position. Accordingly, the desired inclination angle of the circular saw blade 4 can be obtained, with the "0"-angle position being the start point, by operating the handle 16.

After such positioning, the turntable 2 is rotated to a predetermined rotation angle position to thereby engage the steel ball 24 with one of the engaging recesses 13. Under this condition, the handle member 16 of the lock means 11 is operated to rotate the shaft 15 so as to abut against the lock receiving portion 17 of the base 1, whereby the turntable 2 is locked to the predetermined rotation angle position and the workpiece cutting operation is then performed.

Figure 7:
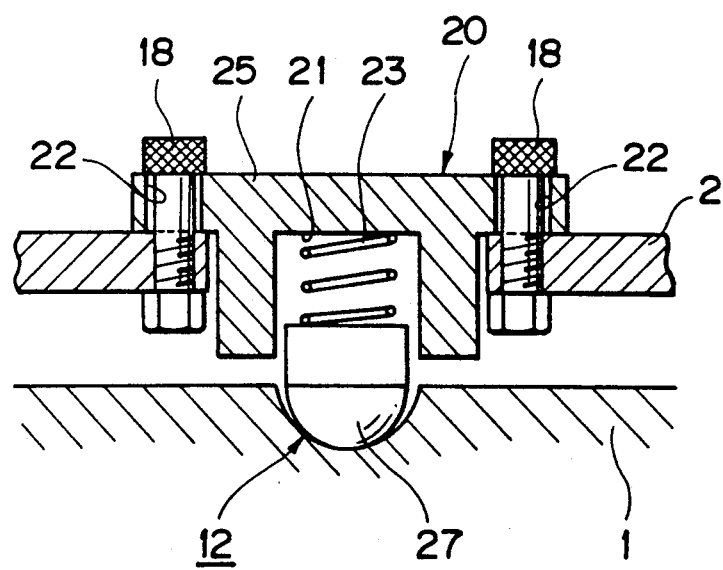
FIG. 7 is a sectional view of another example of the engaging member in association with the cutting machine of FIG. 1.
Figure 8:
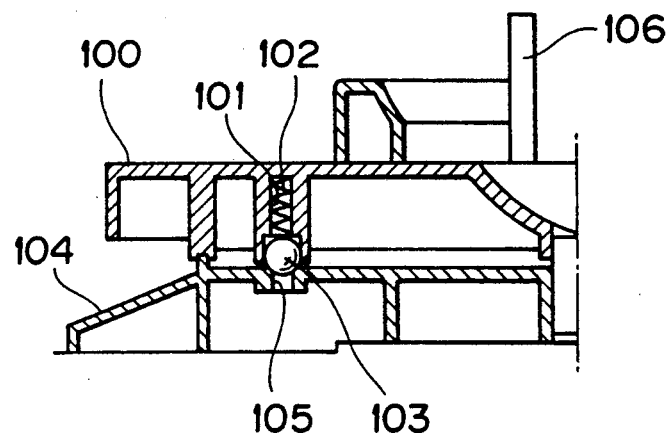
FIGS. 8 and 9 are partially sectional views of conventional turntable positioning apparatus of a desk-type cutting machine, respectively.
Figure 9:
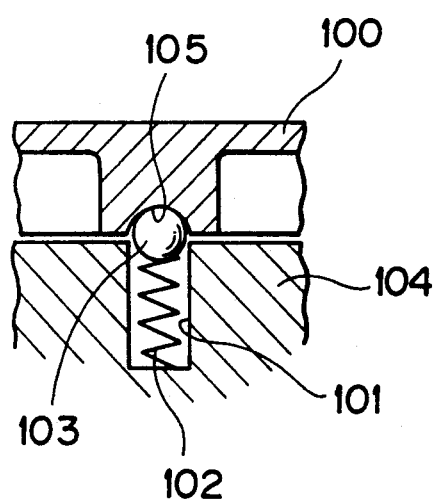

FIG. 7 shows another embodiment of the turntable positioning device of the desk top cutting machine, in which a projection member 27 having a semi-spherical portion is substituted for the steel ball 24 as the engaging member of the aforementioned embodiment. In the modified embodiment of FIG. 7, like reference numerals are added to members corresponding to those of the described first embodiment. The engaging member may be further substituted with a roller or a plate spring.

Furthermore, in the described embodiment, the positioning means 12 is secured to the turntable 2 to be detachable and adjustable in position, but it is not always necessary to secure the positioning means 12 to the turntable 2 and it may be secured to the base 1 to be detachable and adjustable in position. In this modified embodiment, the engaging recess means 13 may be provided on a surface portion opposing to the turntable 2.

Still furthermore, in the described embodiment, the work support fence 5 is integrally formed with the base 1, but the work support fence may be formed independently of the base 1.

This invention is also applicable to a usual desk-top cutting machine in which the circular saw blade 4 is pivoted by the arm 3 so as to be swingably only in a vertical direction in place of the described desk-top cutting machine in which the circular saw blade 4 is slidably mounted.

What is claimed is:

1. A turntable positioning device of a desk-top cutting machine comprising a base, a turntable mounted on the base to be rotatable, a work support fence mounted to the base for guiding a workpiece to be cut, a cutter means disposed swingably towards the workpiece put on the turntable, and a turntable positioning device for positioning the turntable to a predetermined position for a workpiece cutting operation, said turntable positioning device comprising:

a lock means secured to a side end of the turntable and adapted to be engageable with the base;

a positioning engaging means disposed on either one of the turntable and the base; and an engaging receive means formed on the other of the turntable and the base to be engageable with the positioning engaging means, said positioning engaging means comprising an engaging base member secured to one of the turntable and the base to be detachable and adjustable in position, an elastic member disposed in association with the engaging base member, and an engaging member engaged with the engaging receive means by an urging force of the elastic member, said engaging base member comprising a substantially rectangular plate-like member connected to said lock means and having corner portions at which elongated holes are formed, respectively, and a recessed portion formed at a substantially central portion of the plate-like member.

2. A turntable positioning device according to claim 1, wherein the lock means comprises a bearing means disposed on a back surface of the turntable, a shaft member penetrating and engaged with the bearing means and a handle member secured to one end of the shaft member.

3. A turntable positioning device according to claim 1, wherein the elastic member is a spring accommodated in the central recessed portion and the engaging member is a steel ball having an outer spherical configuration and disposed in the central recessed portion.

4. A turntable positioning device according to claim 1, wherein the elastic member is a spring accommodated in the central recessed portion and the engaging member is a projection member having an outer semi-spherical configuration and disposed in the central recessed portion.

5. A turntable positioning device according to claim 1, wherein the engaging receive means is formed on the turntable and composed of a plurality of recesses formed equally spaced apart from each other in a peripheral surface of the turntable concentric with a rotation center thereof.

* * * * *